May 1, 1923.
E. G. THOMAS
WEIGHING SCALE
Filed Feb. 7, 1921
1,453,370
3 Sheets—Sheet 1
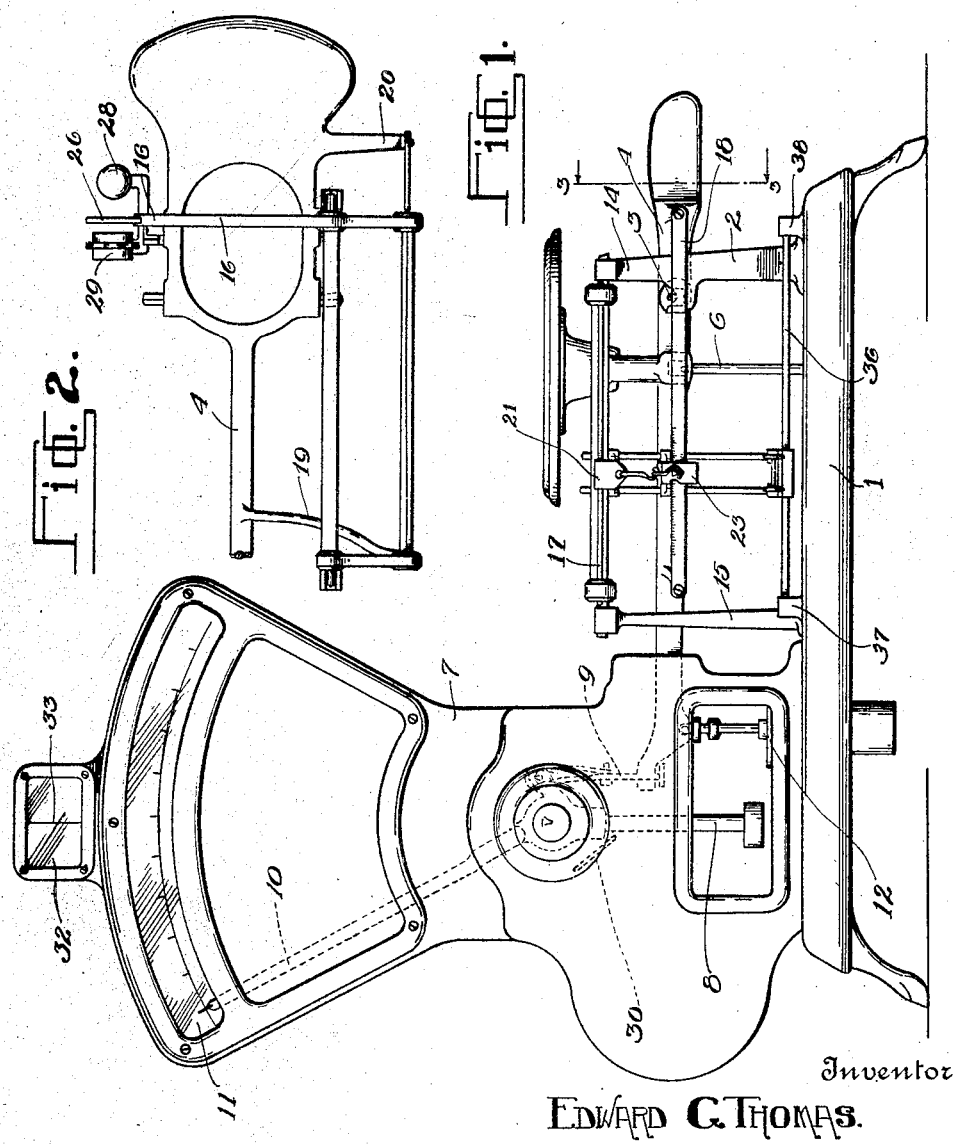
Inventor
EDWARD G. THOMAS.
By C. O. Marshall
Attorney

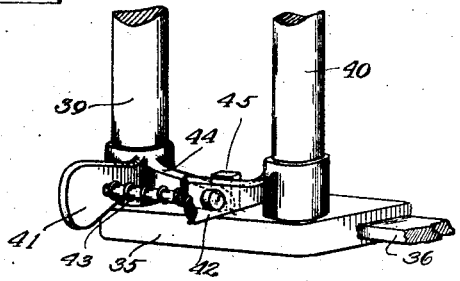
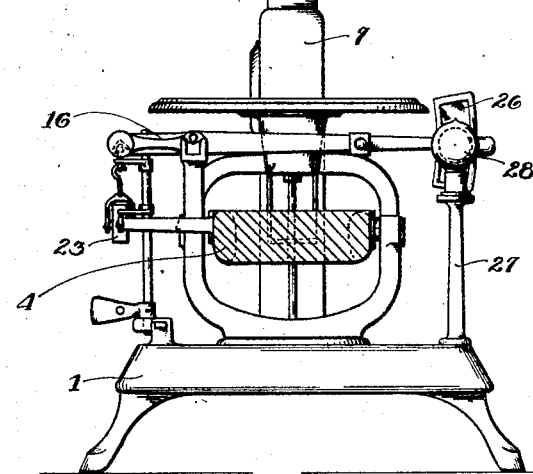
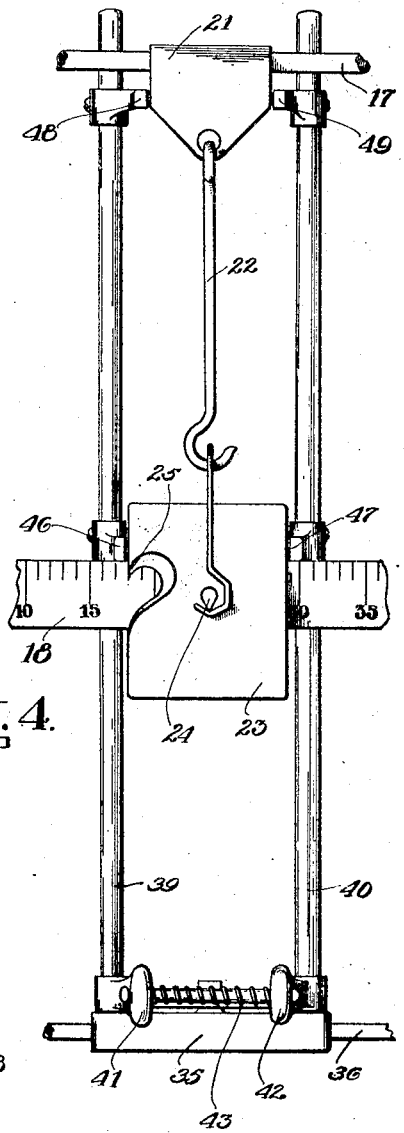

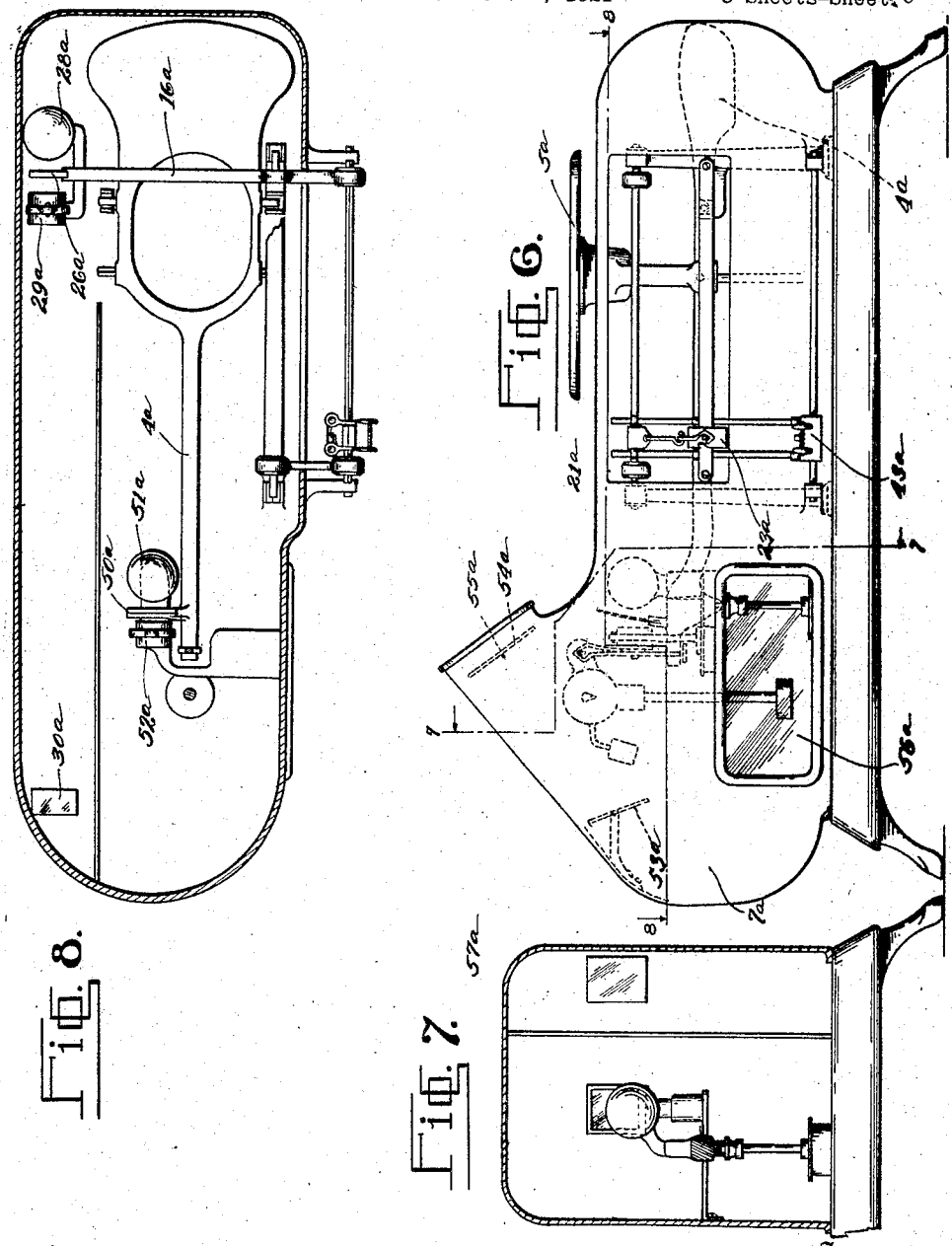

Patented May 1, 1923.

1,453,370

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed February 7, 1921. Serial No. 443,026.

*To all whom it may concern:*

Be it known that I, EDWARD G. THOMAS, a citizen of the United States, residing at Toledo, in the county of Lucas and State of Ohio, have invented certain new and useful Improvements in Weighing Scales, of which the following is a specification.

This invention relates to weighing scales, and particularly to means for indicating values of which the weight is a factor.

One of its principal objects is to provide improved means for computing and indicating such values.

Another important object is to provide means for moving a chart according to a weight value multipled by a price, and for projecting indications from such chart in greatly magnified form upon a screen.

Another object is the provision of a scale having a chart movable according to the weight of a load multiplied by a price per pound, and an indicator for indicating the weights of the loads.

Still another object is the provision of means for bringing indications of the money value and weight of a load into juxtaposition so that they may be easily read.

Other objects and advantages will be apparent from the following description, in which reference is had to the accompanying drawings illustrating preferred embodiments of my invention and wherein similar reference numerals designate similar parts throughout the several views.

In the drawings:—

Figure 1 is a front elevational view of a scale embodying my invention;

Figure 2 is a fragmentary plan view showing the relation of the main scale lever and the lever which controls the money value chart;

Figure 3 is a side elevation of the scale, the main lever being shown in section on the line 3—3 of Figure 1;

Figure 4 is an enlarged detail showing a slide-shifting device employed for changing the multiplication of the leverage controlling the money value chart;

Figure 5 is an enlarged fragmentary perspective view showing the handles by which the slide-shifting device is operated;

Figure 6 is a side elevation of another form of scale embodying my invention;

Figure 7 is a vertical sectional view taken substantially on the line 7—7 of Figure 6; and Figure 8 is a plan view of the mechanism of the scale, the platter and pendulum being removed and the housing shown in section, substantially on the line 8—8 of Figure 6.

In the embodiment shown in Figure 1, the weighing mechanism is supported upon a base 1 of the form commonly employed in "fan type" automatic scales. Supported upon the base adjacent the right side thereof is a fulcrum stand 2 having fixed grooved bearings to receive the fulcrum pivots 3 of the main lever 4 which carries a platform or other commodity-receiver that is maintained in horizontal position by the usual spider stem 6 and check link (not shown). An upright housing 7 is mounted on the end of the base 1 opposite to the end supporting the fulcrum stand 2, and supported within the housing 7 is a load-offsetting pendulum 8 which is connected to the end of the main lever 4 by means of a link 9 and is provided with an indicating hand 10 arranged to swing over a chart 11 to indicate the weight of the load offset by the pendulum.

A dash pot damping device 12 serves to quickly bring the hand to a stop in indicating position.

The mechanism so far described is substantially the same as is usually employed in fan type pendulum scales. It is to be understood, however, that other forms of load-offsetting mechanism may be substituted for the pendulum and other types of indicators may be substituted for the hand 10 and chart 11 without departing from the spirit of the invention.

Fulcrumed upon an upwardly-extending portion 14 of the fulcrum stand 2 and upon an upright 15 positioned adjacent the housing 7 is a lever 16 to which is fixed a rod 17 extending parallel to the plane of movement of the main lever and lying above the graduated beam 18 which is secured to brackets 19 and 20 extending from the main lever 4. Mounted upon the rod 17 is a slide 21 which is connected by means of a link 22 to a slide 23 upon the beam 18, the connection between the link 22 and slide 23 including a knife-edge pivot 24, and the slide being provided with a pointer 25 to indicate the graduations on the beam. The lever 16 is so proportioned as to balance in its bearings while supporting the slides 21 and 23 and the link 22. Since the weight of the slide 23 is entirely carried by the lever 16, it does not act as a poise and its effect on the weighing operation of the scale is nil, regardless of its position on the beam 18.

It is obvious, however, that the amount of movement of the lever 16 for a given movement of the lever 4 will be proportional to the distance of the knife-edge pivot 24 from the axis of the fulcrum pivot of the lever 4. If the slide is so placed that the edges of the fulcrum pivot and the pivot 24 lie in the same straight line, there will be no movement of the lever 16 during a weighing operation. The first graduation on the beam 18 that is reached by the pointer 25 when the slide 23 is moved from this neutral position corresponds to a price of 1¢ per pound, the next graduation to a price of 2¢ per pound, and so on, each fifth graduation being numbered as indicated in Figure 4.

Secured to the free end of the lever 16 is a narrow chart 26 bearing a single row of graduations representing money values ranging from 0 to the product of the highest price on the beam 18 and the number corresponding to the capacity of the scale in pounds. These graduations are designated by appropriate numbers, both the numbers and the graduations being very small.

Supported upon a standard 27 and in cooperative relation to the chart 26 is a projecting device consisting of a lamp 28 and an objective 29. When the lamp is illuminated an image of the portion of the chart which is directly before the center of the lens is projected via the mirror 30 and the mirror 31 upon the ground glass screen. As the chart 26 moves downwardly, the images of the graduations on the screen 32 progress laterally and are successively brought into registration with the indicating line 33 on the screen 32. Since the movement of the lever 4 is proportional to the weight of the commodity, the movement of the chart 26 is proportional to the weight multiplied by the price per pound at which the slide 23 is set. The graduations on the chart are so spaced and the parts so proportioned and arranged that the image of the graduation representing the weight multiplied by the price at which the slide 23 is set will be projected into registration with the indicating line 33. The money value of the commodity is thus indicated upon the screen 32, while the weight is indicated by the hand 10 upon the chart 11.

For the purpose of simultaneously moving the slides 21 and 23 and thus avoiding an out-of-plumb condition in the connection 22, I have provided the slide-shifting device shown in Figures 4 and 5. The device consists of a block 35 slidably mounted upon a bar 36 which is fixed to brackets 37 and 38 on the base 1 and extends substantially parallel to the rod 17 and beam 18. Journaled in the block 35 is a pair of upright rock shafts 39 and 40, to the lower ends of which are fixed handles 41 and 42 having an interposed expansive spring 43 urging them apart and each provided with an arm 44 which engages a lug 45 to limit their movement away from each other. A pair of fingers 46 and 47 extends forwardly from the rock shafts 40 and embraces the slide 23, while a similar pair of fingers 48 and 49 extends forwardly from the upper ends of the shafts 40 and embraces the slide 21. The fingers are normally held out of contact with the slides 21 and 23 so that the weighing movements of the scale are not interfered with, but when the handles 41 and 42 are grasped and pressed toward each other, the fingers engage the slides 21 and 23. The slides may then be simultaneously moved to any positions without affecting the plumb condition of the connection 22.

The form of my device shown in Figures 6, 7 and 8 differs from that above described in several particulars. In lieu of the fan-shaped chart and hand I have mounted a transparent chart 50$^a$ upon the lever 4$^a$. The chart 50$^a$ is provided with weight graduations and co-operates with a projecting device consisting of a lamp 51$^a$ and an objective 52$^a$, which projects an image of a portion of the chart via the mirror 53$^a$ upon a ground glass screen 54$^a$ which faces the platform 5$^a$. With this arrangement, as the lever moves downwardly the images of the graduations will move vertically upon the ground glass screen 54$^a$. The graduations are so spaced and the parts so proportioned that the graduation corresponding to the weight on the platform is brought into registration with an indicating line 55$^a$ on the ground glass screen. The main lever 4$^a$, price chart operating lever 16$^a$, chart 26$^a$, and the projecting apparatus 28$^a$, 29$^a$ are arranged like the similar parts in the form first described, as are the slides 21$^a$ and 23$^a$ and the slide-shifting device 43$^a$. The projection from the value chart 26$^a$ is, however, reflected by only one mirror 30$^a$ and is thrown upon the ground glass screen 54$^a$ beside the weight indication. As is apparent from the arrangement of the chart 26ª, mirror 30ª and screen 54ª, the images of the value graduations move vertically instead of horizontally as in the form first described.

The weighing mechanism and projecting devices in this form of my scale are enclosed in a housing 7ª having an opening through which the ends of the lever 16ª and the brackets project to support the rod 17ª and beam 18ª, and the housing is also provided with a removable window 56ª to render the mechanism in the rearward end of the housing visible and accessible. In order to avoid a confusion of images resulting from an intermixture of light rays, the housing is divided by a partition 57ª which extends between the projecting devices.

While it will be apparent that the illustrated embodiments of my invention herein shown are well capable of adequately fulfilling the objects above stated, it is to be understood that the invention is subject to variation, modification and change within the spirit and scope of the subjoined claims.

Having described my invention, I claim:

1. In a weighing scale, in combination, a pivoted member, means for variably resisting movement of said member whereby it is caused to assume different positions corresponding respectively to the weights of various loads on the scale, a second movable member, means for connecting said second movable member to said pivoted member, whereby said second movable member is caused to move to positions corresponding to the weights of such loads multiplied by selected prices per pound, a chart carried by said second movable member, and means for projecting a magnified indication from said chart.

2. In a weighing scale, in combination, a pivoted member, means for variably resisting movement of said member whereby it is caused to assume different positions corresponding respectively to the weights of various loads on the scale, a second movable member, means for connecting said second movable member to said pivoted member at varying distances from its pivot, whereby said second movable member is caused to move to positions corresponding to the weights of such loads multiplied by selected prices per pound.

3. In a weighing scale, in combination, a pivoted member, means for variable resisting movement of said member whereby it is caused to assume different positions corresponding respectively to the weights of various loads on the scale, a second pivoted member, means for connecting said second pivoted member to the first said pivoted member at varying distances from its pivot whereby said second pivoted member is caused to move to positions corresponding to the weights of such loads multiplied by selected prices per pound, a chart carried by said second pivoted member, and means for projecting a magnified indication from said chart.

4. In a weighing scale, in combination, a pivoted member, means for variably resisting movement of said member whereby it is caused to assume different positions corresponding respectively to the weights of various loads on the scale, a second movable member, means for connecting said second movable member to said pivoted member whereby said second movable member is caused to move to positions corresponding to the weights of such loads multiplied by selected prices per pound, means connected to the said pivoted member for indicating the weight of a load, a chart connected to the second movable member, and means for projecting a given value indication from said chart into juxtaposition with the weight indication.

5. In a weighing scale, in combination, a movable member, means for variably resisting movement of said member whereby it is caused to assume different positions corresponding respectively to the weights of various loads on the scale, a chart connected to said movable member, a second movable member, means for moving the second movable member to positions corresponding to such weights multiplied by selected prices per pound, a chart connected to the said second movable member, and means for projecting indications from said charts into juxtaposition.

6. In a weighing scale, in combination, a lever, means for variably resisting movement of said member whereby it is caused to assume different positions corresponding respectively to the weights of various loads on the scale, a chart connected to said lever, a second lever, means for moving said second lever to positions corresponding to such weights multiplied by selected prices per pound, a chart connected to said second lever, and means for projecting indications from said charts into juxtaposition.

7. In a weighing scale, in combination, a lever, means for resisting movement of said lever whereby it is caused to assume various positions corresponding respectively to various loads on the scale, a second lever extending at right angles to the first said lever, means for connecting the said levers at distances from the fulcrum of the first said lever corresponding to various prices per pound, weight and money value charts carried respectively by said levers, and means for projecting indications from said charts.

8. In a weighing scale, in combination, a chart means whereby said chart is moved to positions corresponding to the weights of various loads on the scale, a second chart means whereby said second chart is moved to positions corresponding to such weights multiplied by selected prices per pound, and means for projecting indications from said charts.

9. In a weighing scale, in combination, a chart means whereby said chart is moved to positions corresponding to the weights of various loads on the scale, a second chart means whereby said second chart is moved to positions corresponding to such weights multiplied by selected prices per pound, and means for projecting indications from said charts into juxtaposition.

EDWARD G. THOMAS.

Witnesses:
H. O. ERNSBERGER,
FRANCES DOYLE.